(12) United States Patent
Street et al.

(10) Patent No.: US 12,485,853 B1
(45) Date of Patent: Dec. 2, 2025

(54) VEHICULAR PEDAL ASSEMBLY WITH ROTATION SENSOR

(71) Applicant: CTS CORPORATION, Lisle, IL (US)

(72) Inventors: Steven Street, Glen Ellyn, IL (US); John Jablonski, Three Rivers, MI (US)

(73) Assignee: CTS CORPORATION, Lisle, IL (US)

( * ) Notice: Subject to any disclaimer, the term of this patent is extended or adjusted under 35 U.S.C. 154(b) by 0 days.

(21) Appl. No.: 18/900,298

(22) Filed: Sep. 27, 2024

(51) Int. Cl.
*B60T 7/04* (2006.01)
*G01D 5/14* (2006.01)
*G01D 11/24* (2006.01)
*G01P 13/04* (2006.01)

(52) U.S. Cl.
CPC .............. *B60T 7/042* (2013.01); *G01D 5/142* (2013.01); *G01P 13/04* (2013.01); *B60T 2220/04* (2013.01); *G01D 11/245* (2013.01)

(58) Field of Classification Search
CPC ........ B60T 7/04; B60T 7/042; B60T 2220/04; G01D 5/142; G01D 11/245; G01P 13/04
See application file for complete search history.

(56) References Cited

U.S. PATENT DOCUMENTS

| | | | | |
|---|---|---|---|---|
| 5,963,124 A | * | 10/1999 | Buss ...................... | H01C 10/34 338/160 |
| 9,441,989 B2 | * | 9/2016 | Kaiser ..................... | G01D 5/14 |
| 10,837,980 B2 | * | 11/2020 | Muramatsu ............... | B60T 8/00 |
| 11,614,765 B2 | * | 3/2023 | Miller ....................... | G01D 3/08 74/514 |
| 2006/0117902 A1 | * | 6/2006 | Martin ...................... | G05G 1/38 74/512 |
| 2025/0181102 A1 | * | 6/2025 | Clark ....................... | B60T 7/042 |

FOREIGN PATENT DOCUMENTS

CN 118850028 A * 10/2024 ............. G01D 5/142

* cited by examiner

*Primary Examiner* — Adam D Rogers
(74) *Attorney, Agent, or Firm* — Michael Best & Friedrich LLP

(57) ABSTRACT

A rotation sensor for a vehicular pedal includes a sensor housing, a sensor circuit secured to the sensor housing, and a target rotatable with the pedal about an axis. The target has an assembly position proximal to the sensor circuit such that the sensor circuit detects a rotational position of the target and the pedal through a range of positions. A key is selectively engageable with one or both of the target and the sensor housing. The rotation sensor has a first configuration in which the key is retained by the target and disengaged from the sensor housing. The rotation sensor has a second configuration in which the key engages both the target and the sensor housing to impede movement of the target relative to the sensor housing. The rotation sensor has a third configuration in which the key is disengaged from the target and retained by the sensor housing.

20 Claims, 10 Drawing Sheets

VEHICULAR PEDAL ASSEMBLY WITH ROTATION SENSOR

BACKGROUND

The present invention relates to vehicular pedal assemblies. Such pedal assemblies include brake pedal assemblies well known in conventional motor vehicles to enable a driver to apply braking force by engagement of the driver's foot. Such a pedal assembly includes a housing mountable to the vehicle body, a movable pedal, and may include one or more sensors to track position and/or force during application of the pedal.

SUMMARY

In one aspect, the invention provides a vehicular pedal assembly. A pedal housing includes a mounting surface for securement within a vehicle. A pedal has a first portion proximal to the pedal housing and a foot pad spaced from the pedal housing, the pedal rotatable through a range of positions in response to force applied at the foot pad. A pivot shaft is supported by the pedal housing and rotatable with the pedal. A rotation sensor includes a sensor housing, a sensor circuit secured to the sensor housing, and a target rotatable with the pedal and the pivot shaft about an axis. The target has an assembly position proximal to the sensor circuit such that the sensor circuit is operable to detect a rotational position of the target and the pedal through the range of positions. A key is selectively engageable with one or both of the target and the sensor housing. The rotation sensor has a first configuration in which the key is retained by the target and the key is disengaged from the sensor housing. The rotation sensor has a second configuration in which the key engages both the target and the sensor housing to impede movement of the target relative to the sensor housing. The rotation sensor has a third configuration in which the key is disengaged from the target and retained by the sensor housing.

In another aspect, the invention provides a method of assembling a vehicular pedal assembly. Operational testing is conducted on a rotation sensor, including moving a target of the rotation sensor relative to a sensor circuit and a sensor housing of the rotation sensor while in a first configuration in which the target retains a key. Following testing, the rotation sensor is reconfigured to a second configuration in which the key engages both the target and the sensor housing to impede movement of the target relative to the sensor housing. The rotation sensor in the second configuration is provided to a pedal housing. The rotation sensor is transitioned to a third configuration in which the key is disengaged from the target and retained by the sensor housing. A pedal is coupled with the target for co-rotation so that a position of the pedal can be tracked with the rotation sensor in the third configuration.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. It should be understood that the description of specific embodiments is not intended to limit the disclosure from covering all modifications, equivalents, and alternatives falling within the spirit and scope of the disclosure. Also, it is to be understood that the phraseology and terminology used herein is for the purpose of description and should not be regarded as limiting.

Figure 1:
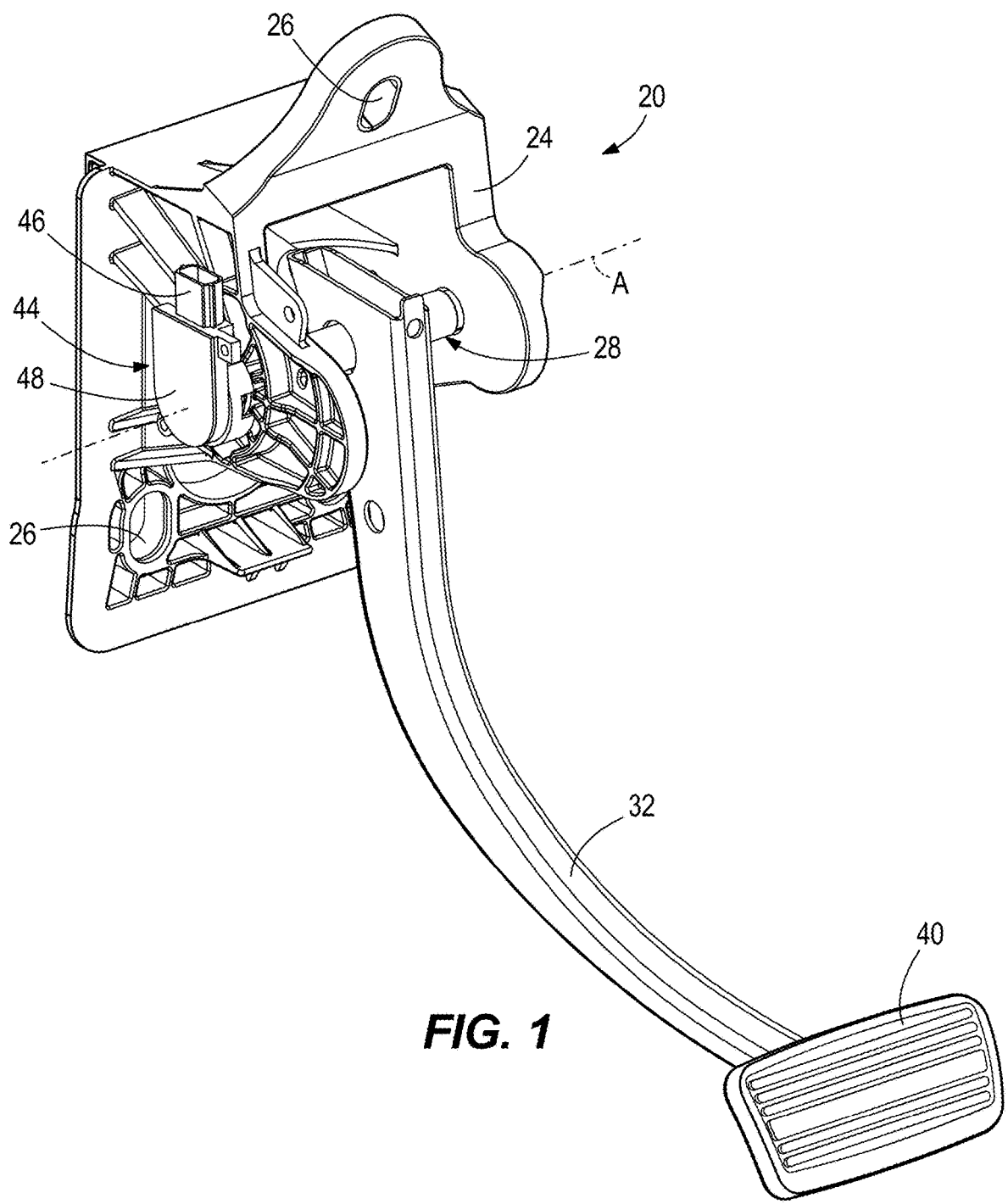
FIG. 1 is a perspective view of a vehicular pedal assembly according to one embodiment of the present disclosure.

FIG. 1 illustrates a vehicular pedal assembly 20 including a bracket or housing 24 and a pedal arm or simply "pedal" 32 positioned for use by a driver of the vehicle and movable relative to the housing 24 to control the travel of the vehicle. In one construction, the pedal assembly 20 is a brake pedal assembly. The housing 24 of the brake pedal assembly 20 is configured to mount to a vehicle bulkhead (or "firewall") to fix its position in relation to the vehicle body. FIG. 1 illustrates a plurality of fastener receiving apertures 26 in the housing 24 for mounting within the vehicle. The pedal 32 has a distal portion that extends away from the housing 24 in which a proximal portion of the pedal 32 is supported. A pivot shaft 28 extends through the proximal portion of the pedal 32, and the housing 24 rotatably supports the pivot shaft 28. The pivot shaft 28 is rotatable with the pedal 32. Although not the subject of the present disclosure, it is noted that the pivot shaft 28 can be provided as a single-piece component or multi-piece assembly, and may be mechanically keyed or connected with the pedal 32 in any suitable manner. The distal portion of the pedal 32 can be provided with a foot pad or footrest 40 for contact by the driver's foot. The foot pad 40 is spaced from the pedal housing 24 and the pivot shaft 28. The pedal 32 of the brake pedal assembly 20 can be mechanically coupled to a hydraulic master cylinder to enable a driver force on the pedal 32 to be conveyed (e.g., with amplification) through hydraulic fluid to wheel cylinder (s) to clamp a rotor that rotates with a wheel of the vehicle. In other aspects, the brake pedal assembly 20 is provided in a brake-by-wire (BBW) system in which the force on the pedal 32 is decoupled from the wheel cylinder(s), and the actuation of the pedal 32 is sensed electronically to generate a braking signal for an electronic controller, which in turn, actuates a braking actuator that is mechanically independent of the brake pedal assembly 20. In either case, the brake pedal assembly 20 includes one or more sensors operable to collect data regarding the operation of the brake pedal 32.

Figure 4:
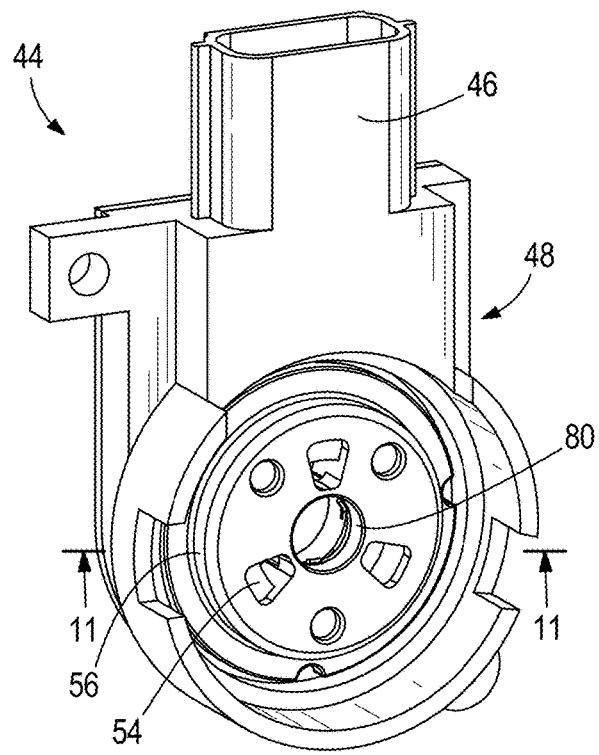
FIG. 4 is a perspective view of the rotation sensor shown in FIG. 3.
Figure 11:
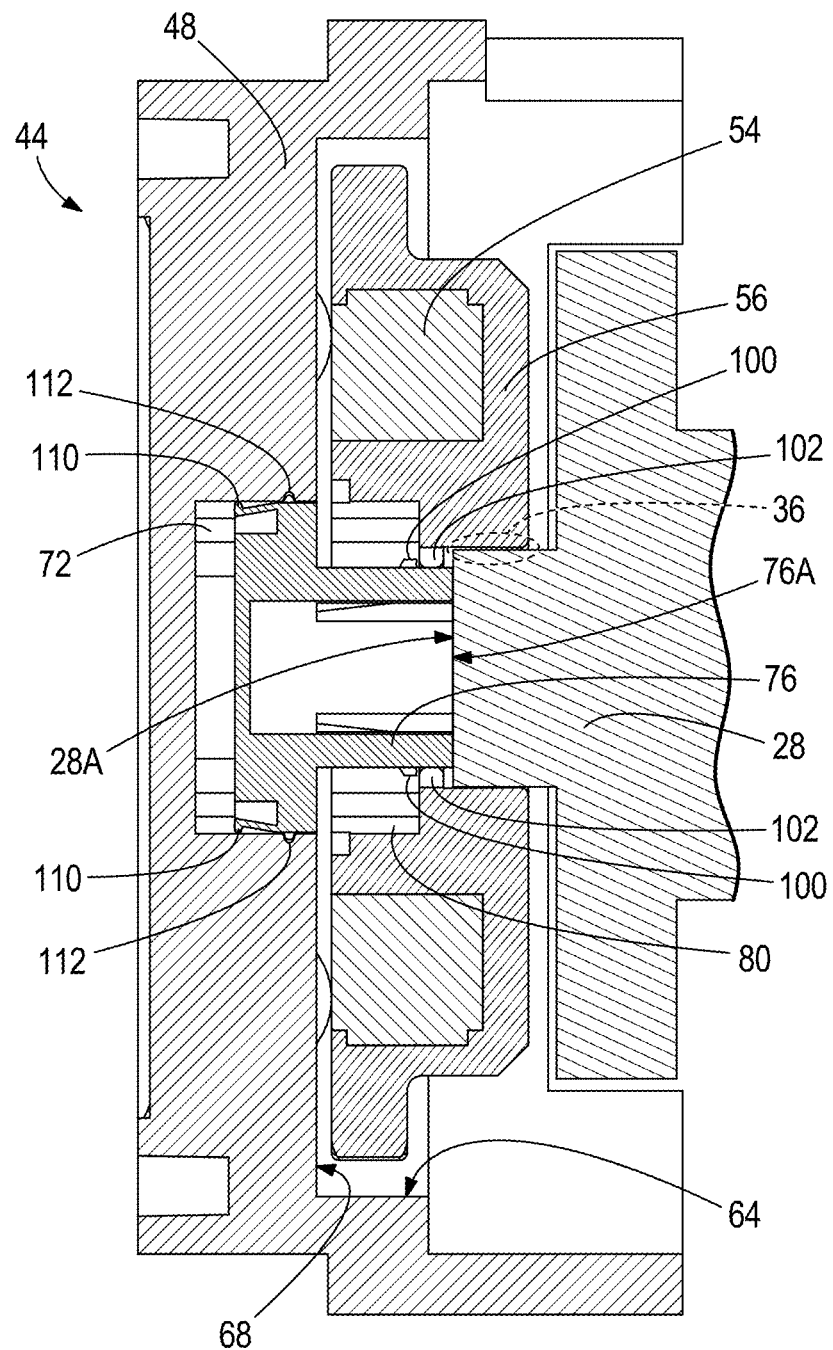
FIG. 11 is a cross-section taken through the assembled pedal assembly, at a center of the rotation sensor. The temporary keying element is in a final assembly position, decoupled from the rotatable portion of the rotation sensor.

One such sensor 44 is operable to track the position of the pedal 32. More particularly, the sensor 44 is a rotational position sensor, or simply "rotation sensor," operable to track rotational change of the pedal 32 relative to the housing 24. As described in further detail below, the rotation sensor 44 tracks the rotation of the pedal 32, indirectly, by engagement with and tracking of the pivot shaft 28, which rotates with the pedal 32 during use. FIG. 4 illustrates a central opening 80 in a portion 56 of the rotation sensor 44, and FIG. 11 illustrates an end portion of the pivot shaft 28 connected therewith, defining a co-rotation interface 36. The interface 36 may extend through less than the entire axial span of the opening 80. The rotation sensor 44 can track and provide an output signal indicative of pedal position throughout a useful travel range of the pedal 32. The rotation sensor 44 can be connected for signal communication with the controller. The rotation sensor 44 can be implemented in the vehicle braking system as a brake apply sensor, providing the controller a signal indicative of the level or amount of braking input. As described in further detail below, the rotation sensor 44 can be a non-contact sensor. The rotation sensor 44 can operate by sensing change in the magnitude and/or direction of the magnetic field generated by a magnet that is coupled for rotation with the shaft 28 and the pedal 32 (e.g., Hall effect). In some constructions, the pedal assembly 20 also includes a pedal force sensor operable to measure force applied to the pedal 32 (e.g., piezoelectric, load cell, or strain gauge).

Figure 2:
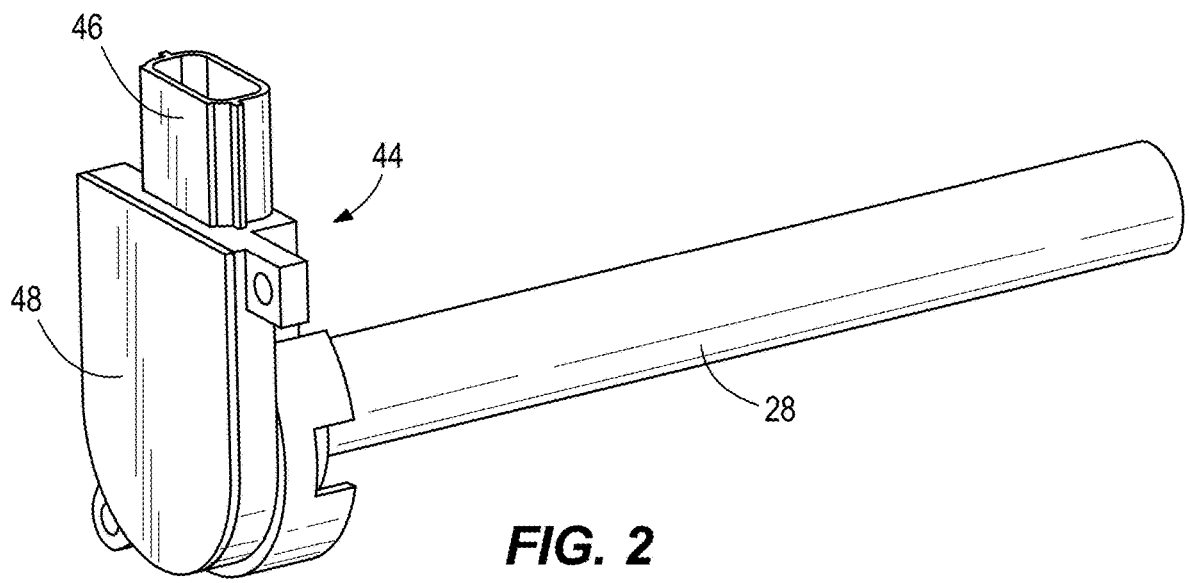
FIG. 2 is a perspective view of the pedal assembly of FIG. 1, with parts removed to illustrate a pedal shaft assembly and rotation sensor.
Figure 3:
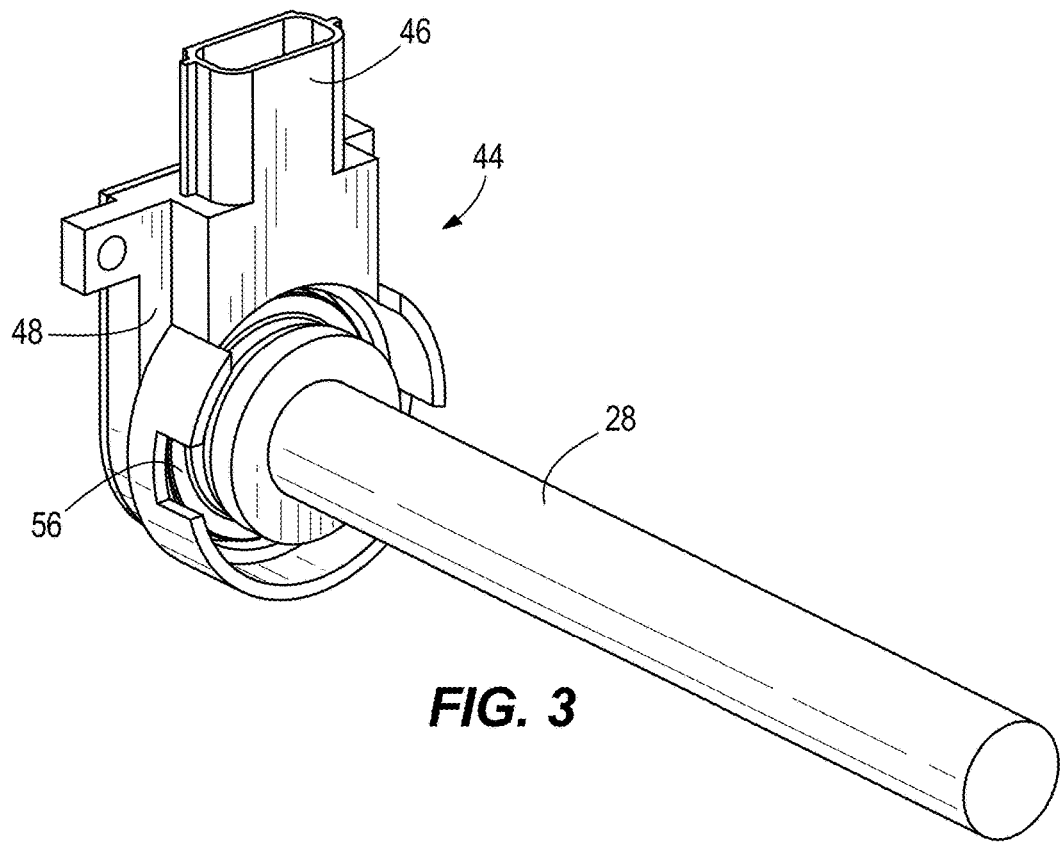
FIG. 3 is an alternate perspective view of the components shown in FIG. 2.

FIG. 2 illustrates the pivot shaft 28 and the rotation sensor 44 of the pedal assembly 20 in isolation. The pivot shaft 28 defines the axis A of rotation for the pedal 32. The pivot shaft 28 can be supported by bearings or bushings engageable with corresponding apertures (e.g., in flanges or "ears") of the housing 24. Signal communication with the electronic controller is provided through an electrical connector 46 of the rotation sensor 44. The electrical connector 46 can be a plug-in multi-pin connector including an outer shroud that extends from the housing 24. Although the connector 46 is shown as extending generally upward and/or forward, in an opposite direction from the pedal 32 in the illustrated construction, the rotation sensor 44 may be assembled and used in any desired orientation about the axis A. As such, the rotation sensor 44 may be considered rotationally universal as it need not be manufactured specific to any predetermined orientation of use. A wire harness connector (not shown) can plug into the electrical connector 46. Communication may be established via CAN bus, SENT, or another protocol, either digital or analog. The pivot shaft 28 has a first end (right, as shown in FIGS. 2 and 3) remote from the rotation sensor 44. As described above, the second end of the pivot shaft 28 opposite the first end is adjacent to and engaged with the rotation sensor 44 so that a rotatable portion of the sensor 44 rotates in sync with the pivot shaft 28, which in turn, rotates in sync with the pedal 32. As shown in FIGS. 1-3, the rotation sensor 44 can be a sensor module having its own housing 48, which may be provided in one or more parts to substantially enclose the functional inner workings. The sensor housing 48 is attachable to and removable from the housing 24. For example, the sensor housing 48 can include a mounting flange having an aperture for a fastener to secure the sensor housing 48 to the housing 24. In some constructions, the rotation sensor 44 can be assembled and shipped in an assembled state to a manufacturing facility where final assembly of the pedal assembly 20 takes place.

Figure 6:
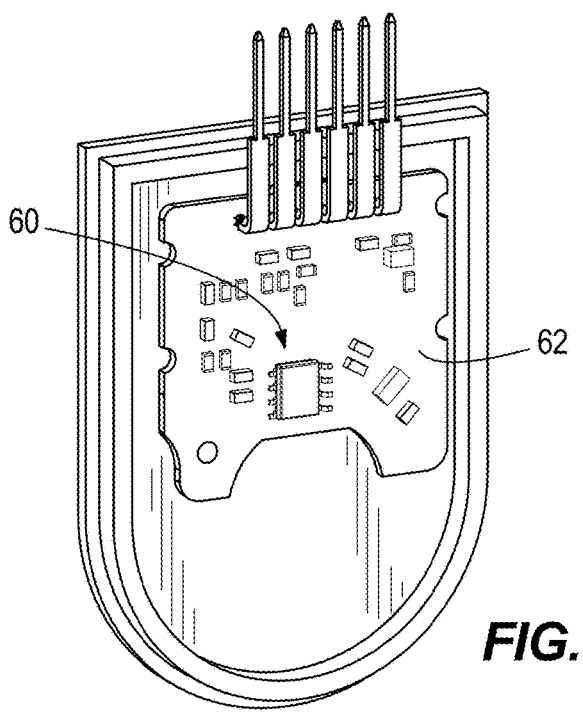
FIG. 6 is a perspective view of a circuit board with a sensing circuit of the rotation sensor shown in FIGS. 3-5.

The rotation sensor 44 can be a non-contact type sensor (e.g., Hall effect), and can be implemented with rotatable and non-rotatable portions as described in further detail below. In other constructions, any suitable and readily available sensor topology can be used. For use with a Hall-effect rotation sensor 44, the rotatable portion includes a magnet 54 (permanent magnet). As shown in FIGS. 3 and 4, the rotatable portion of the rotation sensor 44 can also include a magnet holder or carrier 56. The magnet holder 56 facilitates attachment of the sensor's rotatable portion with the pivot shaft 28. As shown in FIG. 6 where a portion of the sensor housing 48 is removed, the rotation sensor 44 further includes a sensor circuit 60 (e.g., on a printed circuit board 62). When assembled, the magnet 54 and the magnet holder 56 are positioned relative to the stationary sensor circuit 60 such that when the pedal 32 is moved, the magnet 54 moves across the sensor circuit 60, and the magnetic field change is detected by the sensor circuit 60 to precisely track the position of the pedal 32. The rotatable portion of the sensor, and in particular the magnet 54 of the illustrated embodiment, forms a target that is detectable by the sensor circuit 60. In another exemplary embodiment, the target or rotatable portion of the sensor 44 includes a piece of metal, and the sensor circuit 60 is configured as an inductive sensor circuit operable to track the rotational position of the pedal 32 via the target as it moves therewith.

Figure 5:
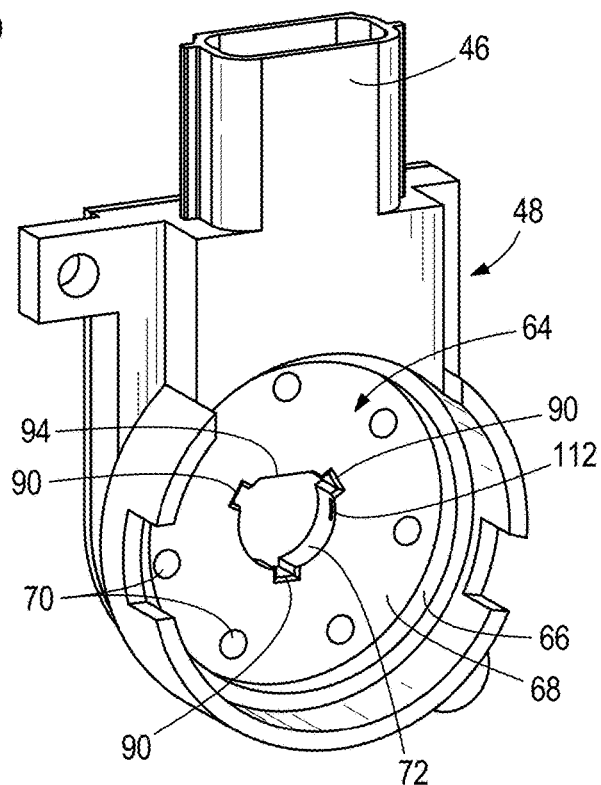
FIG. 5 is a perspective view of a stationary portion of the rotation sensor shown in FIGS. 3 and 4.

As shown in FIG. 5, the sensor housing 48 includes a cavity or recess 64 that receives the rotatable portion of the sensor 44. The recess 64 can include a cylindrical side wall 66 and a substantially flat end wall 68. The end wall 68 can include a plurality of raised portions or nibs 70 that reduce the amount of surface area contact between the end wall 68 and the sensor's rotatable portion during operation. The raised portions can be rounded (e.g., semi-spherical). From the end wall 68, a secondary cavity or recess 72 is provided depending from the recess 64. The secondary recess 72 is centered on the axis A. The secondary recess 72 has a non-circular profile, as described further below. The secondary recess 72 is configured to accommodate a keying element or "key" 76 that selectively controls the restraint of the rotatable portion of the rotation sensor 44 with respect to the stationary sensor circuit 60. The key 76 is shown assembled to the magnet holder 56 in FIG. 7 and in isolation in FIGS. 9 and 10. FIG. 11 is a cross-section view illustrating the final operational configuration for the rotation sensor 44, including the pivot shaft 28 mated with the magnet holder 56. The secondary recess 72 can be a closed or "dead-end" chamber, only open to the end wall 68 of the recess 64. As described below, the key 76 acts as a position assurance feature, for multiple positions or configurations of the rotation sensor 44.

Figure 9:
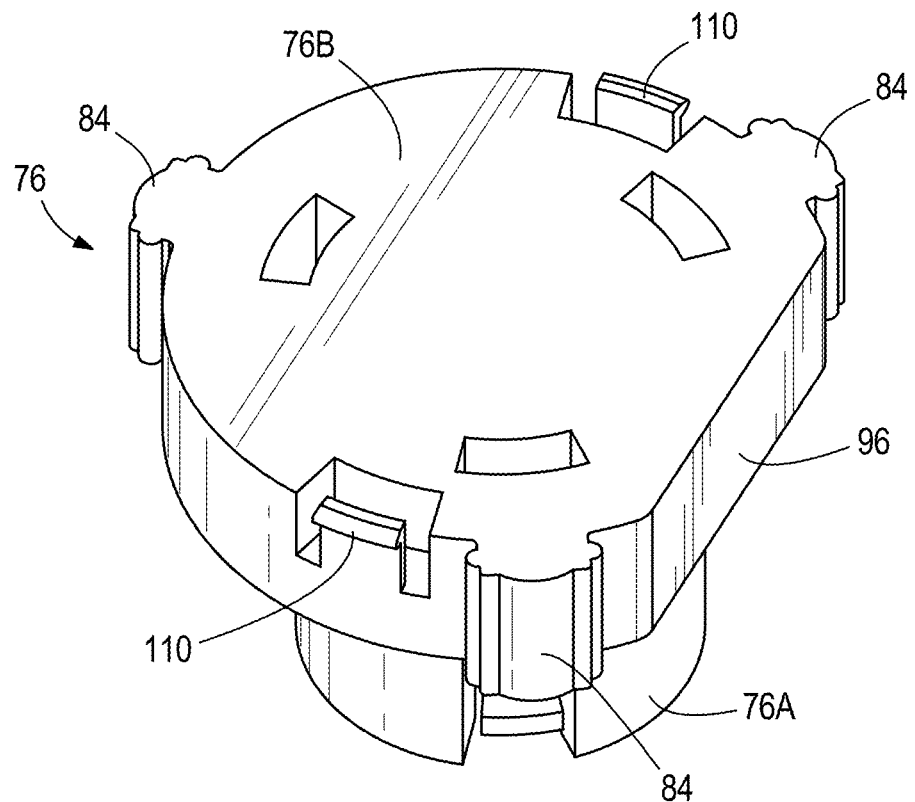
FIG. 9 is a perspective view of the temporary keying element of FIG. 7.
Figure 10:
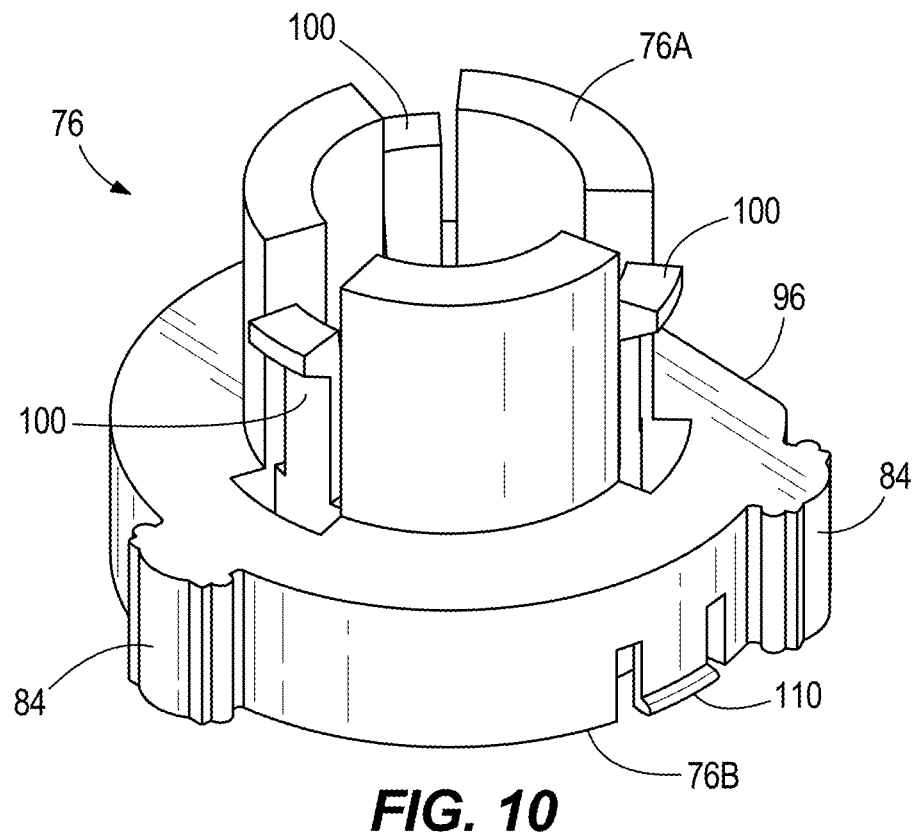
FIG. 10 is an alternate perspective view of the temporary keying element of FIG. 9.

As shown in FIGS. 9 and 10, the key 76 has a first axial end 76A and a second axial end 76B. The first axial end 76A is insertable into the central opening 80 in the magnet holder 56. The second end 76B is larger than the first end 76A, and the opening 80 is counterbored so that the key 76 cannot pass through the opening 80. The outer profile of the key 76 and the inner profile of the opening 80 are complementary and non-circular. In other words, the key 76 is keyed to the opening 80 and only insertable in a predetermined orientation, or a finite number of orientations. As illustrated, the key 76 has a plurality of (e.g., three) radially projecting ribs or prongs 84 that are accommodated in a corresponding plurality of slots 86 along the opening 80. At the interface of the prongs 84 and slots 86, crush ribs may be provided. The crush ribs deform upon assembly, and inhibit incidental separation, keeping the key 76 assembled in the opening 80 of the magnet holder 56.

The secondary recess 72 in the sensor housing 48 is similar to the opening 80 in the magnet holder 56 in that it has a corresponding plurality of slots 90 similar to the slots 86. However, the secondary recess 72 also has a feature (such as a single flat side 94) that sets a single orientation for reception of the key 76. For example, the key 76 may also have a single flat side 96 along an otherwise round or cylindrical shape. The opening 80 in the magnet holder 56 also has a flat side corresponding to the flat side 96 of the key 76 in the illustrated construction, although this is considered optional and may not be provided in other constructions.

Figure 7:
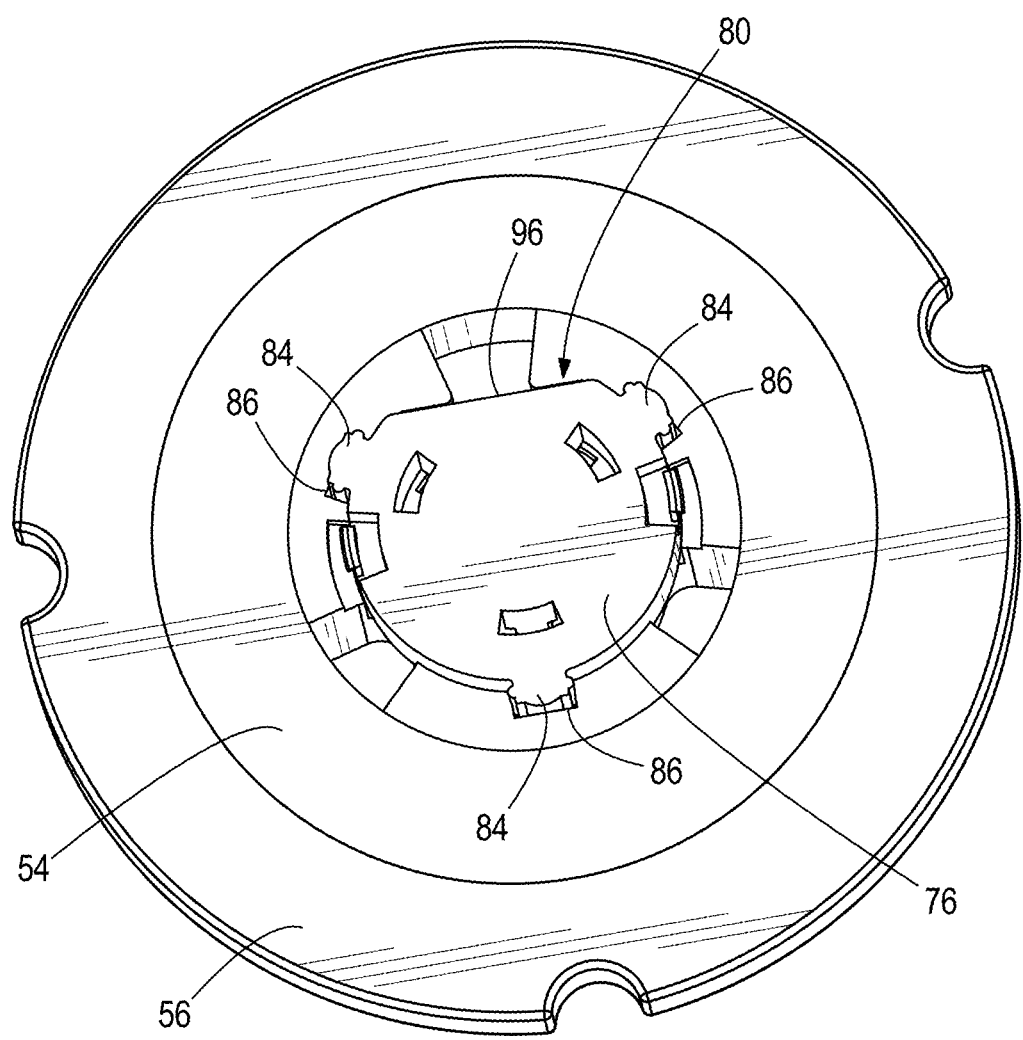
FIG. 7 is a perspective view of a rotatable portion of the rotation sensor of FIGS. 3-6, along with a temporary keying element therein.
Figure 8:
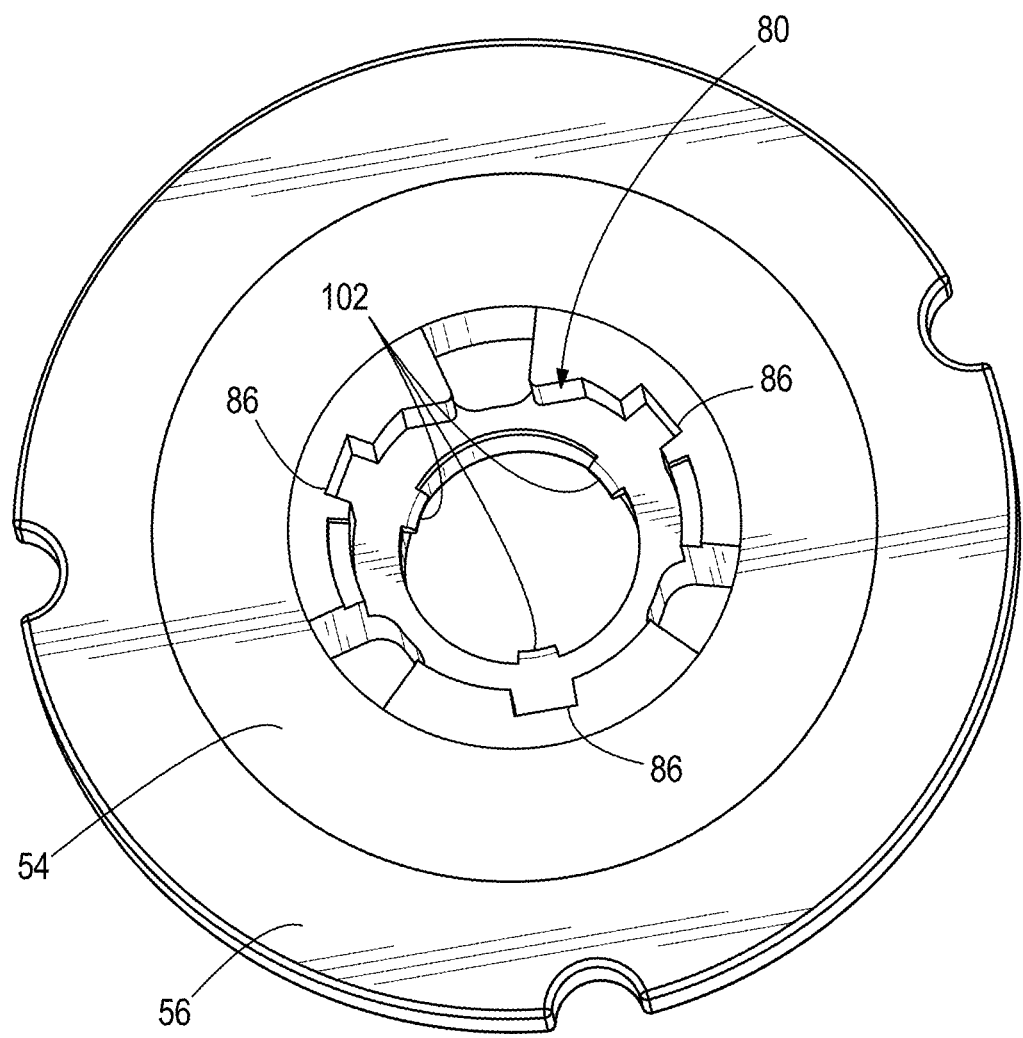
FIG. 8 is a perspective view of the rotatable portion of FIG. 7, with the temporary keying element removed.

As the operation of the rotation sensor 44 relies on rotation of the magnet holder 56 about the axis A with respect to the sensor housing 48, the magnet holder 56 itself does not have any means for locking or preventing movement with respect to the sensor housing 48. They key 76 provides such a means, in a temporary manner throughout various assembly stages before the rotation sensor 44 goes into service with the brake pedal 20. With reference to FIGS. 7 and 8, the key 76 is oriented to the magnet holder 56 so that the slots 86 receive the ribs 84. The key 76 is then slid axially into the opening 80. The insertion of the key 76 overcomes a detent so that the key 76 is not freely removable from the opening 80. The detent can be provided by interfering structures of the mating parts, at least one of which elastically deflects upon sufficient assembly force. In the illustrated construction, the detent is provided by one or more (radially inwardly) flexible snap fingers 100 of the key 76 and one or more (radially inwardly raised) walls 102 in the opening 80. The key 76 can have an axial thickness that is substantially the same as that of the magnet holder 56 so that the key 76 does not protrude outside the magnet holder 56 on either end.

Figure 12:
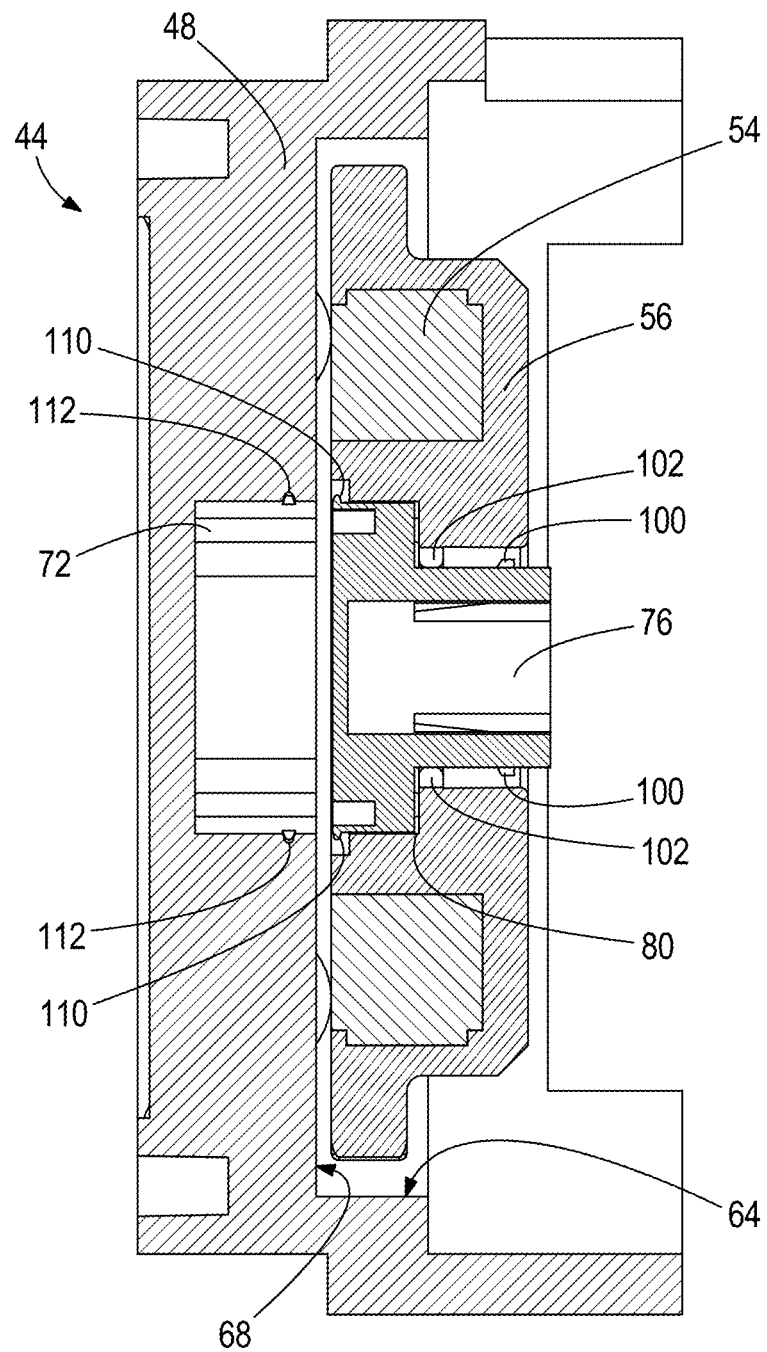
FIG. 12 is a cross-section similar to FIG. 11, taken in an initial pre-assembly configuration where the temporary keying element is retained by the rotatable portion of the rotation sensor.
Figure 13:
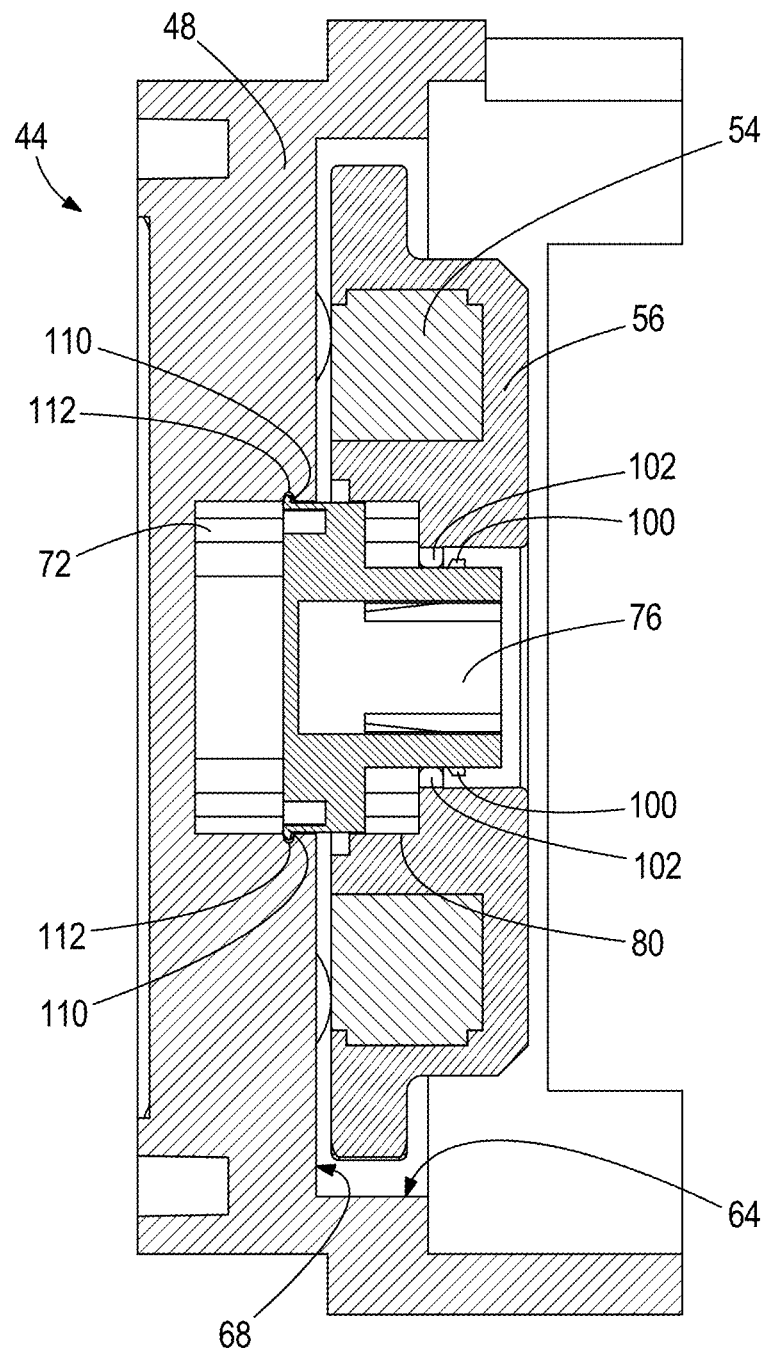
FIG. 13 is a cross-section similar to FIG. 12, showing the temporary keying element in a keying configuration engaged with both the rotatable and stationary portions of the rotation sensor.

In the first configuration, the key 76 is inserted in the magnet holder 56, but remains disengaged from the sensor housing 48 (FIG. 12). The first configuration allows for initial testing in which the rotation sensor 44 is operationally assembled for electrical verification. During such testing, the brake pedal 20 is not assembled. As such, the pivot shaft 28 is not assembled and is not used for controlling the rotational position of the rotatable portion (magnet holder 56). The testing may instead rely on workshop tooling and or fixtures external to the components of the rotation sensor 44 and the brake pedal 20. Once the initial testing is completed and proper operation of the sensor circuit 60 is confirmed in response to rotation of the magnet 54 and the magnet holder 56, the key 76 is moved axially at least partially into the secondary recess 72 in the sensor housing 48—sliding from the position of FIG. 12 to the position of FIG. 13. FIG. 13 shows a second configuration of the rotation sensor 44. In the second configuration, the key 76 is axially positioned to engage both the magnet holder 56 and the sensor housing 48 to impede movement of the magnet 54 and magnet holder 56 target relative to the sensor housing 48 and the sensor circuit 60. This configuration may be referred to as a locked configuration of the rotation sensor 44, or alternately, a shipping or transport configuration.

More particularly, in the second configuration, the key 76 has a detent position defined with the sensor housing 48. In the illustrated construction, one or more snap fingers 110 (e.g., tips thereof) engage with corresponding pockets or groove(s) 112 in the secondary recess 72. As noted above, FIG. 13 illustrates the snap fingers 110 engaged with the grooves 112. One of the grooves 112 is also observable in FIG. 5. Due to the profile of the key 76 matching profiles of the secondary recess 72 and the opening 80, the magnet holder 56 is set into a predetermined rotational orientation with respect to the sensor housing 48. The predetermined rotational orientation can be a "home" or "zero" position in some constructions, as defined by the magnet 54 and the sensor circuit 60. In any case, the key 76 can hold a predetermined orientation through storage and/or movement of the rotation sensor 44. For example, the rotation sensor 44 can be packed at the first (manufacturing/testing) facility and shipped to a second (brake pedal assembly) facility while in the second configuration of FIG. 13. The key 76 also retains the magnet holder 56 against separation from the sensor housing 48 in the second configuration. In particular, axial movement of the magnet holder 56 away from the end wall 68 is limited by the flexible snap fingers 100 of the key 76 and cooperating walls 102 in the opening 80. The key 76 is dimensioned such that the flexible snap fingers 100 and walls 102 keep the prongs 84 engaged with the slots 86. The detent provided by the flexible snap fingers 100 and the walls 102 must be overcome to allow the prongs 84 to exit the slots 86 and enable rotation of the magnet holder 56 with respect to the key 76. This occurs once the rotation sensor 44 is ready to be assembled with the brake pedal 20.

For example, attachment of the rotation sensor housing 48 to the brake pedal housing 24 and pivot shaft 28 introduces interference that drives the key 76 from the second configuration of FIG. 13 to the third configuration of FIG. 11. In particular, an axial end 28A of the pivot shaft 28 abuts the first end 76A of the key 76 and drives movement of the key 76 within the rotation sensor 44, along the axis A. This not only releases the detent formed between the flexible snap fingers 110 and the grooves 112 in the secondary recess 72, but also overcomes the detent between the flexible snap fingers 100 and the walls 102 in the opening 80 (first overcome in the other direction during initial assembly of the key 76 to the magnet holder 56). Thus, the key 76 is received further in the secondary recess 72 and released from engagement with the magnet holder 56. Although part of the key 76 may still reside within the opening 80 of the magnet holder 56, the two are not engaged (e.g., the prongs 84 are removed from the slots 86). Despite the temporary key connection being "broken" when shifting out of the locked second configuration, the key 76 does not require manual removal, nor any disassembly of the rotation sensor 44. Shifting out of the second configuration does not produce any debris (loose pieces), nor introduce any additional propensity for noise during operation. The key 76 remains within the secondary recess 72 of the sensor housing 48 for the operational life of the rotation sensor 44 with the brake pedal 20 despite only serving a functional purpose in the time prior to the operational life. As long as the sensor housing 48 is secured to the pedal housing 24 and the pivot shaft 28 is assembled, the presence of the pivot shaft 28 prevents reverse movement of the key 76 back toward the keyed relationship with the magnet holder 56, whether the two are in contact or merely in close proximity. In other words, incidental re-keying of the magnet holder 56 is prevented by the pivot shaft 28.

Figure 14:
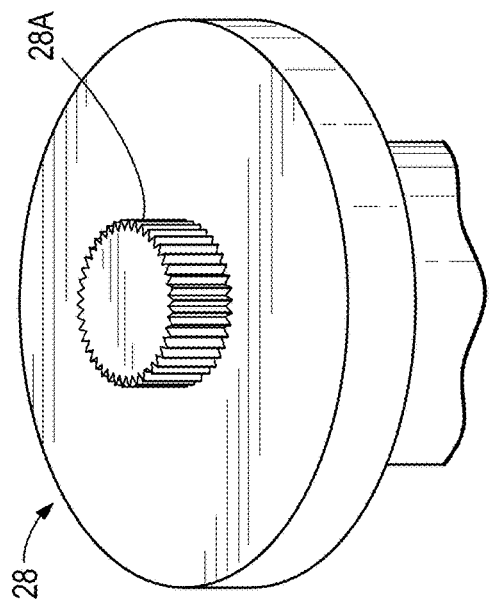
FIG. 14 is a perspective view of a sensor engagement end of a pedal shaft according to a first embodiment of the present disclosure.
Figure 15:
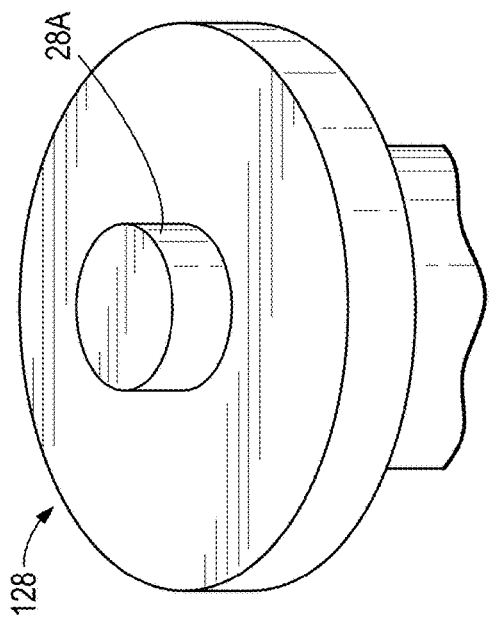
FIG. 15 is a perspective view of a sensor engagement end of a pedal shaft according to a second embodiment of the present disclosure.
Figure 16:
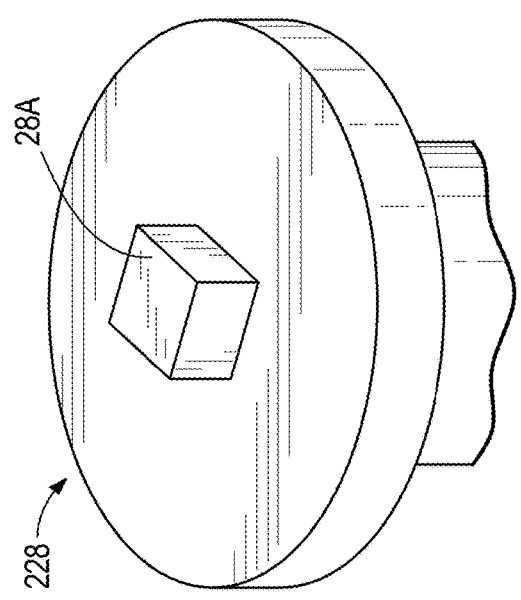
FIG. 16 is a perspective view of a sensor engagement end of a pedal shaft according to a third embodiment of the present disclosure.
Figure 17:
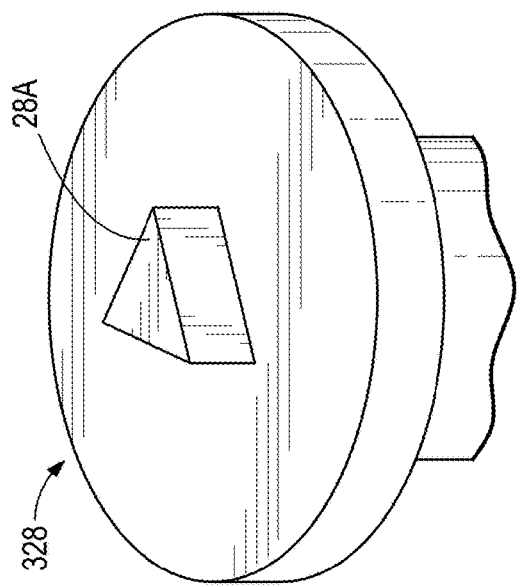
FIG. 17 is a perspective view of a sensor engagement end of a pedal shaft according to a fourth embodiment of the present disclosure.

During engagement of the pivot shaft 28 and the key 76 to release the key 76 from the magnet holder 56, the pivot shaft 28 may establish a connection with the magnet holder 56 that locks them for co-rotation. Rather than having a pre-defined relative rotational orientation, the pivot shaft 28 and the magnet holder 56 are unkeyed with respect to one another. Instead of being keyed, they are constructed in a manner that allows attachment in any given rotational orientation. The various manners of making the joint between the pivot shaft and the magnet holder 56 can include permanent deformation, e.g., plastic deformation of the opening 80 in the magnet holder 56. In practice, the brake pedal manufacturer can merely control the desired rotational position of the pedal 32 when the rotation sensor 44 is assembled to the housing 24 and be assured that the desired relationship between the pedal 32 and the sensor 44 is set, since the key 76 holds the magnet holder 56 is a prescribed rotational orientation until the pivot shaft 28 mates with the magnet holder 56. As shown in FIG. 14, the pivot shaft 28 can include a boss with teeth, also referred to as a circular array of axially-extending pointed edges, at its end 28A. The teeth are configured to cut into the magnet holder 56 during assembly, thus establishing a joint therebetween. As shown in the alternate pivot shaft 128 of FIG. 15, the end 28A can be provided without teeth—instead circular or another shape dimensioned to provide a press fit or interference fit with the opening 80 in the magnet holder 56. Although not shown, the outside surface of the pivot shaft 128 that fits into the opening 80 may be knurled in some constructions. As shown in the alternate pivot shafts 228, 328 of FIGS. 16 and 17, the end 28A can be provided without a circular array of spline teeth, but rather, pointed edges of a polygonal or other non-circular profile shape configured to cut into the magnet holder 56 in a similar way to establish the joint and co-rotatability.

Various features and advantages of the invention are set forth in the following claims.

What is claimed is:

1. A vehicular pedal assembly comprising:
   a pedal housing including a mounting surface for securement within a vehicle;
   a pedal having a first portion proximal to the pedal housing and a foot pad spaced from the pedal housing, wherein the pedal is rotatable through a range of positions in response to force applied at the foot pad;
   a pivot shaft supported by the pedal housing and rotatable with the pedal;
   a rotation sensor including a sensor housing, a sensor circuit secured to the sensor housing, and a target rotatable with the pedal and the pivot shaft about an axis, the target having an assembly position proximal to the sensor circuit such that the sensor circuit is operable to detect a rotational position of the target and the pedal through the range of positions; and
   a key selectively engageable with one or both of the target and the sensor housing,
   wherein the rotation sensor has a first configuration in which the key is retained by the target and the key is disengaged from the sensor housing,
   wherein the rotation sensor has a second configuration in which the key engages both the target and the sensor housing to impede movement of the target relative to the sensor housing, and
   wherein the rotation sensor has a third configuration in which the key is disengaged from the target and retained by the sensor housing.

2. The vehicular pedal assembly of claim 1, wherein the vehicular pedal assembly is a brake pedal assembly and the rotation sensor is a brake apply sensor.

3. The vehicular pedal assembly of claim 1, wherein the target of the rotation sensor includes a permanent magnet and a magnet holder.

4. The vehicular pedal assembly of claim 1, wherein the key includes one or more flexible snap fingers configured to cooperate with the sensor housing or the target for defining a detent for one or more of: the first configuration, the second configuration, and third configuration.

5. The vehicular pedal assembly of claim 1, wherein the key includes a first flexible snap finger that, along with a cooperating structure of the sensor housing, defines a detent with the sensor housing in the second configuration, and the key includes a second flexible snap finger that overcomes a detent defined by the second flexible snap finger and a cooperating structure of the target between the second and third configurations.

6. The vehicular pedal assembly of claim 1, wherein the pivot shaft and the target define a co-rotation interface via respective joint portions.

7. The vehicular pedal assembly of claim 6, wherein the respective joint portions are configured to mate through plastic deformation of the target.

8. The vehicular pedal assembly of claim 7, wherein the respective joint portions include pointed edges on the pivot shaft configured to cut into a central opening of the target.

9. The vehicular pedal assembly of claim 6, wherein the respective joint portions are unkeyed to enable assembly in any desired rotational orientation about the axis.

10. The vehicular pedal assembly of claim 1, wherein the key is positioned directly adjacent an end surface of the pivot shaft such that the rotation sensor is configured to be driven from the second configuration to the third configuration by contact between the key and the end surface of the pivot shaft along the axis.

11. The vehicular pedal assembly of claim 1, wherein the key is held in a prescribed rotational orientation by a secondary recess of the sensor housing depending from a recess of the sensor housing that accommodates the target.

12. A method of assembling a vehicular pedal assembly, the method comprising:
   conducting operational testing on a rotation sensor, including moving a target of the rotation sensor relative to a sensor circuit and a sensor housing of the rotation sensor while in a first configuration in which the target retains a key;
   following testing, reconfiguring the rotation sensor to a second configuration in which the key engages both the target and the sensor housing to impede movement of the target relative to the sensor housing;
   providing the rotation sensor in the second configuration to a pedal housing;
   transitioning the rotation sensor to a third configuration in which the key is disengaged from the target and retained by the sensor housing; and coupling a pedal with the target for co-rotation so that a position of the pedal can be tracked with the rotation sensor in the third configuration.

13. The method of claim 12, wherein the transition to the third configuration occurs during coupling the pedal with the target for co-rotation.

14. The method of claim 13, wherein the transition to the third configuration occurs by driving the key out of engagement with the target by contact with an end of a pivot shaft on which the pedal is supported with respect to the pedal housing.

15. The method of claim 14, wherein the pedal is coupled with the target for co-rotation by plastic deformation of the target by the pivot shaft.

16. The method of claim 15, wherein the plastic deformation occurs by driving pointed edges of the pivot shaft into an opening of the target.

17. The method of claim 12, further comprising establishing a detent position of the key with respect to the target during assembly of the key into the target prior to the conducting of the operational testing, wherein the detent position is maintained in the second configuration.

18. The method of claim 17, wherein during the transition to the third configuration, the detent position is overcome, and a new detent position of the key is established with respect to the sensor housing.

19. The method of claim 18, wherein the detent position and the new detent position are established through elastic deflection of flexible snap fingers on the key.

20. The method of claim 12, wherein reconfiguring the rotation sensor to the second configuration includes sliding the key, in a prescribed keyed orientation, partially into a secondary recess of the sensor housing depending from a recess of the sensor housing that accommodates the target.

* * * * *